(12) United States Patent
Woodhouse

(10) Patent No.: US 6,394,056 B1
(45) Date of Patent: May 28, 2002

(54) INTERNAL COMBUSTION ENGINE

(75) Inventor: Timothy Charles Woodhouse, Drayton Parslow (GB)

(73) Assignee: Stephen Ronald Tickner, Dunstable (GB)

(*) Notice: Subject to any disclaimer, the term of this patent is extended or adjusted under 35 U.S.C. 154(b) by 0 days.

(21) Appl. No.: 09/622,502

(22) PCT Filed: Feb. 19, 1999

(86) PCT No.: PCT/GB99/00525

§ 371 (c)(1),
(2), (4) Date: Oct. 13, 2000

(87) PCT Pub. No.: WO99/42712

PCT Pub. Date: Aug. 26, 1999

(30) Foreign Application Priority Data

Feb. 20, 1998 (GB) .............................................. 9803633

(51) Int. Cl.[7] .............................. F02B 31/00; F02F 1/42
(52) U.S. Cl. ..................................... 123/193.5; 123/306
(58) Field of Search ................................. 123/306, 309, 123/430, 193.5

(56) References Cited

U.S. PATENT DOCUMENTS

| | | | |
|---|---|---|---|
| 4,366,787 A | | 1/1983 | Gale |
| 4,850,317 A | * | 7/1989 | Katsumoto et al. .......... 123/306 |
| 5,277,160 A | * | 1/1994 | Choma et al. ............... 123/306 |
| 5,669,347 A | * | 9/1997 | Cullen et al. ................ 123/306 |
| 6,055,727 A | * | 5/2000 | Brignall ....................... 123/306 |
| 6,065,437 A | * | 5/2000 | Kleinschmidt ............ 123/193.5 |

FOREIGN PATENT DOCUMENTS

| | | |
|---|---|---|
| DE | 4018065 | 12/1991 |
| DE | 4120181 | 12/1992 |
| EP | 006 82176 | 11/1995 |
| NL | 7904268 | 12/1979 |

* cited by examiner

*Primary Examiner*—Marguerite McMahon
(74) *Attorney, Agent, or Firm*—Dymeka Gossett PLLC

(57) ABSTRACT

An internal combustion engine has an inlet port side angle (B) which is greater than 60° and is preferably 101°±3°. The exhaust valve side angle (C) is preferably 93°±3°. The inlet valve seat (3) is located closer to the longitudinal axis (8) of the cylinder than the exhaust valve seat (4) and the imaginary line (16) which passes through the geometric centres of the valve seats (3, 4) is offset from the diameter (7) of the cylinder. This combination of characteristics gives an engine having a high specific power output, low specific fuel consumption, low emissions of carbon monoxide and unburnt hydrocarbons and a cool exhaust gas containing a significant volume of oxygen.

12 Claims, 3 Drawing Sheets

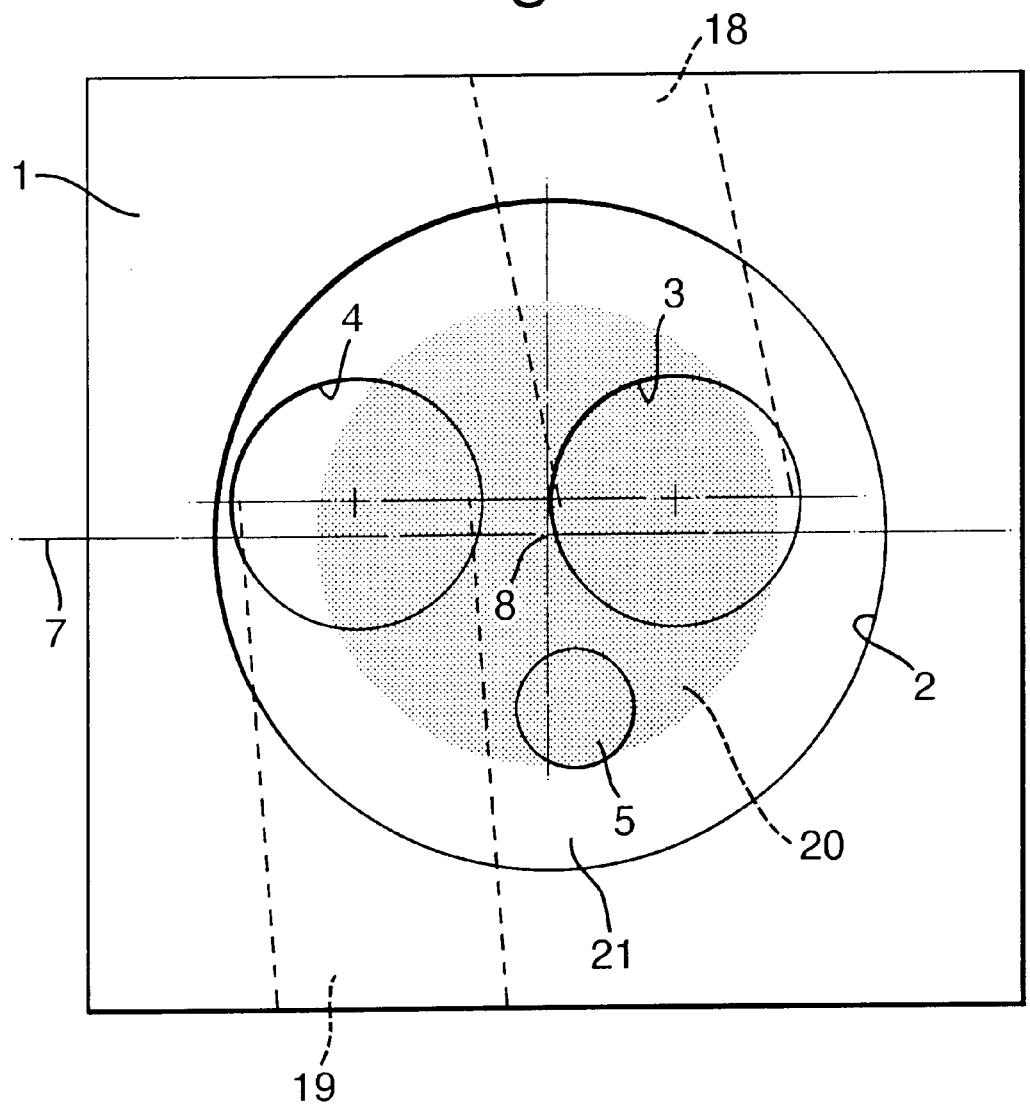

INTERNAL COMBUSTION ENGINE

BACKGROUND AND SUMMARY OF THE INVENTION

This invention relates to an internal combustion engine, and in a preferred embodiment of the invention provides a small single cylinder internal combustion engine of high efficiency suitable for use, for example, in a motor cycle or to drive a small generator, pump or the like. Whilst the preferred embodiment of the invention is concerned with such small engines, and in particular such engines of single cylinder design, it is to be understood that the invention is not limited to such designs and features of the invention may be applicable to multi-cylinder engines and to engines of relatively large size.

For the purposes of this application it will be assumed that the engine in question is oriented such that the longitudinal axis of the cylinder is vertical and the axis of rotation of the crankshaft is horizontal with the said axes intersecting at a point vertically below the geometric centre of the piston. With such an orientation the cylinder head is above the piston and when viewed from above the cylinder head will lie between the viewpoint and the crown of the piston. It should be appreciated that in practice engines in accordance with embodiments of the invention need not have this orientation, but this orientation will be used in this description since it provides a convenient method of defining the relative positions of the various components of the engine.

In a conventional overhead valve engine each cylinder has one inlet valve and one exhaust valve. Each valve has associated therewith a valve seat. An inlet port connects a source of combustion air (usually admixed with fuel) to the inlet valve seat and an exhaust port connects the exhaust valve seat to an exhaust outlet which normally has connected thereto an exhaust pipe and silencer arrangement. The inlet and exhaust ports have longitudinal centre lines which, when viewed from above, are generally straight. When viewed from the sides, the inlet and exhaust ports generally have a major portion which is straight although there may be some change of direction of the port immediately adjacent the valve seat. Even if there is some local variation in the shape of the ports adjacent the valve seats, the inlet and exhaust ports generally have a substantially straight longitudinal centre lines when viewed from the side over the majority of their length.

The position of the longitudinal centre lines of the inlet and exhaust ports can be defined by two angles, the first (hereinafter referred to as the side angle) being the angle which the longitudinal centre line, when projected onto a plane perpendicular to the longitudinal axis of the cylinder, makes relative to an imaginary line passing through the geometric centres of the inlet and exhaust valve seats when that imaginary line is also projected onto the said plane. The other angle (hereinafter referred to as the vertical angle) is the angle which the longitudinal centre line of the port makes to the said plane. For the purposes of this specification the side angle of a port is considered to be 0° when the projection of the longitudinal centre line of the port onto the said plane is coincident with the projection onto that plane of the imaginary line passing through the geometric centres of the inlet and exhaust valves and overlies that portion of the imaginary line which is located on the side of the valve seat associated with the port in question which is remote from the other valve seat. The side angle is always considered to be positive, i.e. the side angle of a port is stated to be X° if the port is rotated X° clockwise or X° anti-clockwise from the 0° position. It follows from this that the maximum possible value of side angle is 180°, and this occurs when the projection of the longitudinal centre line of the port onto a plane perpendicular to the longitudinal axis of the cylinder is coincident with and overlies that portion of the imaginary line passing through the geometric centres of the valve seats which is located between the geometric centres of the valve seats.

For a general review of the widely accepted understanding of the significance of the various characteristics of small internal combustion engines attention is directed to Chapter 9 of MOTOR CYCLE ENGINEERING by P. E. Irving published by Clymer Publications of Los Angeles, Calif., U.S.A. (ISBN 0-85113-075-5). It will be noted from this publication that it is well recognized that a high level of turbulence or swirl within the combustion chamber is desirable to ensure complete combustion of the fuel in a motor cycle sized internal combustion engine. It is further recognized that the desired swirl can be achieved by angling the inlet port relative to the imaginary line passing through the geometric centres of the inlet and exhaust valve seats in a manner which produces the required level of swirl i.e. giving the inlet port a side angle of greater than 0°. It is further recognized that, whilst increasing the side angle of the inlet port increases the amount of swirl with the result that high levels of torque are produced at low and medium speeds, as the side angle is increased the volumetric efficiency of the engine decreases resulting in limited performance at high revs and accordingly limited maximum power output. In fact, in many modern engines, for example the Honda GX160, a side angle of substantially 0° is used for the inlet port notwithstanding the well recognised advantages of using an inlet port side angle of greater than 0° to increase cylinder swirl. It is generally recognised that the side angle of the inlet port should not exceed 18°.

I have now discovered that improved performance can be obtained if the inlet port side angle is substantially greater than would be considered acceptable in conventional engine design.

Accordingly, one aspect of the present invention provides an internal combustion engine having a cylinder; a piston reciprocable within the cylinder; a cylinder head closing the top of the cylinder; an inlet valve mounted in the cylinder head; an inlet valve seat against which the inlet valve closes; an exhaust valve mounted in the cylinder head; an exhaust valve seat against which the exhaust valve closes; a source of combustion air; and an inlet port connecting the source of combustion air to the inlet valve seat, wherein the side angle of the inlet port is greater than 60°.

The cylinder head may be formed separately from the cylinder block and secured thereto by conventional means, or may be integral with the cylinder block.

In the preferred embodiment of the invention the inlet port side angle is in the range 60°–160°. For the avoidance of doubt, the disclosure herein of the range 60°–160° is to be construed as a disclosure of every range having a lower limit between 60° and 160° and an upper limit of between 60° and 160°.

It has been found that the optimum inlet port side angle is in the range 90° to 112° and more particularly in the range 95°–107° with a preferred value of 101°±3°. The inlet port vertical angle can be varied depending on the desired maximum speed of the engine. For slow running engines a relatively small vertical angle will produce optimum results whilst a higher vertical angle will provide improved results at high revs. The preferred vertical angle is in the range of 10° to 60°. Different embodiments of engines according to the present invention have been found to work satisfactorily with inlet port vertical angles of 24°±3° and 55°±3°.

The exhaust port angles are less critical to performance of the engine than the inlet port angles. In the preferred embodiment of the invention the exhaust port side angle is in the range 90°–95° with a preferred value of 93° and the exhaust valve vertical angle is in the range 3°–23° with a most preferred value of 13°.

It has been found that the performance of the engine can be further enhanced if the inlet and exhaust valve seats are placed asymmetrically relative to the longitudinal axis of the cylinder. In particular, in one preferred arrangement the inlet valve is located closer to the longitudinal axis of the cylinder than the exhaust valve. In a particularly preferred embodiment of the invention the inlet valve is positioned such that the most central portion of the inlet valve seat lies substantially on the projected longitudinal axis of the cylinder whilst the nearest point of the exhaust valve seat to the said projected longitudinal axis is displaced some distance from the projected longitudinal axis. It has also been found that performance of the engine is enhanced if the inlet valve is offset from the diameter of the cylinder which passes through the geometric centre of the exhaust valve. The effect of this arrangement is such that the imaginary line passing through the geometric centres of the inlet valve seat and the exhaust valve seat is parallel to but displaced to one side of a reference diameter of the cylinder. Preferably, the inlet port approaches the inlet valve seat from the side of the inlet valve seat remote from this reference diameter. The effect of this arrangement, in combination with the large inlet port side angle of the invention, is that the combustion air enters the cylinder generally tangentially to the cylinder wall. This produces a high level of swirl and, it is believed, leads to stratification of the fuel air mixture with the result that a fuel rich mixture is created in the central region of the cylinder, this fuel rich region being surrounded by a region which is fuel lean or even substantially devoid of fuel. It is believed that this stratification effect contributes at least in part to the excellent operating characteristics of the embodiments of engine according to the present invention.

If the believed stratification effect occurs it follows that enhanced combustion will be achieved if the sparking plug is located as close as possible to the geometric centre of the fuel rich zone. This will typically be close to the longitudinal axis of the cylinder. Positioning the sparking plug at this point should reduce the burn time for the fuel, thereby reducing the amount of ignition advance required and reducing the Nox emissions of the engine.

The advantages of the present invention are particularly apparent when the engine is of the "over square" type, that is to say the diameter of the cylinder is greater than the stroke of the piston. Such an arrangement enables relatively large sized valves to be accommodated without having to angle the valves relative to the longitudinal axis of the cylinder. In other words, with an over square engine the valves can be mounted so that their longitudinal stems are parallel to the longitudinal axis of the cylinder. The high degree of swirl and high volumetric efficiency produced by the port designs according to the present invention enable the engine to operate efficiently without the conventional angling of the valves. This leads to easy and cost effective manufacture of the cylinder head. The inlet and exhaust valves can be identical which further reduces manufacturing costs.

Engines manufactured in accordance with the present invention have been found to achieve very low emission levels of carbon monoxide. For example, in one test engine carbon monoxide emission levels of 0.06% have been achieved. These low carbon monoxide levels are accompanied by very low levels of unburnt hydrocarbon, for example 4 parts per million, and good levels of $CO_2$ emission. The engine has also to be found to be tolerant of low octane fuels since it is resistant to fuel detonation. The exhaust of test engines has also been found to have high levels of oxygen suggesting that the preferred inlet port geometry leads to a degree of stratification whereby fuel is concentrated in the central portion of the combustion chamber. The exhaust emissions from test engines were also found to be at low temperature. Test engines have been found to give good power output and low specific fuel consumption.

The invention will be better understood from the following description of a preferred embodiment thereof, given by way of example only, reference being had to the accompanying drawings.

BRIEF DESCRIPTION OF THE DRAWINGS

FIG. 5 is a view corresponding to FIG. 2 showing the believed stratification of charge within the cylinder.

DETAILED DESCRIPTION OF THE PREFERRED EMBODIMENT

Figure 1:
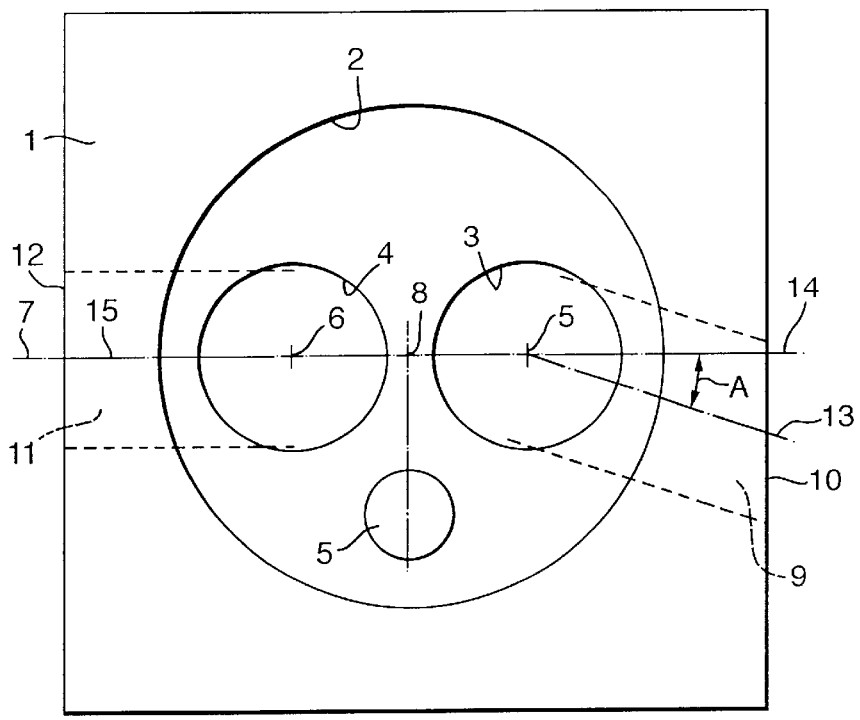
FIG. 1 illustrates schematically the arrangement of the inlet and exhaust valves and the inlet and exhaust ports of a conventional single cylinder internal combustion engine.
Figure 2:
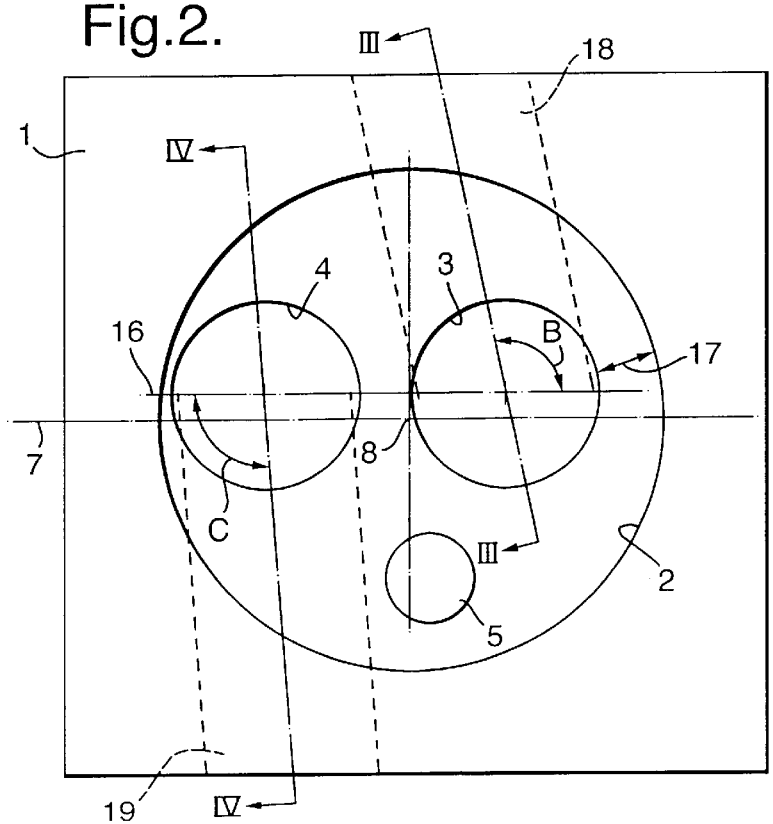
FIG. 2 is a view of FIG. 1 illustrating a preferred embodiment of engine in accordance with the present invention.

Referring firstly to FIGS. 1 and 2, the Figures show schematically an engine viewed from above. In each case, the position of the cylinder 2 and the outer edges of the inlet valve seat 3 and exhaust valve seat 4 are shown. The position of the sparking plug 5 is also shown. It will of course be appreciated that in practice when the engine is viewed from above neither the cylinder 2 nor the valve seats 3,4 will be visible.

In FIG. 1, which shows a typical prior art design, it will be noted that the geometric centres 5,6 of the valve seats lie on a diameter 7 of the cylinder and are equally spaced from the longitudinal axis 8 of the cylinder. An inlet port 9 extends through the cylinder head 1 from an inlet 10 to a chamber located immediately above the inlet valve seat 3. Likewise, an exhaust port 11 extends through the cylinder head from a chamber located immediately above the exhaust valve seat 4 to an exhaust outlet 12 located on the side of the cylinder head. In practice, a carburetor will in general be mounted to supply a fuel-air mixture to the inlet 10 and an exhaust pipe and silencer arrangement will be connected to the exhaust outlet 12.

The position of the inlet port 9 and the exhaust port 11 can conveniently be defined by reference to the longitudinal centre lines thereof. When projected onto the plane of the paper of FIG. 1 (which is a plane perpendicular to the longitudinal axis 8) the longitudinal centre line 13 of the inlet port 9 makes an angle A to the line 14 which passes through the geometric centres 5,6 of the inlet and exhaust valves, when that line is also projected onto the plane of the paper. This angle is referred to as the inlet port side angle. In the case illustrated in FIG. 1 the inlet port side angle is approximately 18°. By convention, the inlet port side angle is measured from the portion of the imaginary line 14 which lies on the side of the inlet valve seat 3 remote from the exhaust valve seat 4 and is expressed as a positive angle regardless of whether the projection of longitudinal centre line 13 onto the plane of the paper is displaced clockwise or anti-clockwise from the projection of the line 14 onto the plane of the paper.

In the engine illustrated in FIG. 1 the longitudinal centre line 15 of the exhaust port 11, when projected onto the plane of the paper, directly overlies the portion of the imaginary line 14 which is located on the side of the exhaust valve seat 4 remote from the inlet valve seat 3. The side angle of the exhaust port 11 is accordingly 0°.

The longitudinal centre lines 13,15 of the inlet port and exhaust port respectively also subtend an angle to the plane of the paper. This angle is referred to as the "vertical angle" and is typically close to 0°.

In conventional engine designs (see MOTORCYCLE ENGINEERING referred to above) it was recognised that increased swirl was associated with an increase in the inlet port side angle A. However, it was equally recognised that increasing the side angle A lead to a reduction in volumetric efficiency and an unacceptable curtailing of the maximum power output. It was accordingly believed that the optimum side angle A was in the range of 12°–18°.

Referring now to FIG. 2 there is an illustration corresponding to FIG. 1, but this time of a preferred embodiment of the invention.

It will be noted that the position of the valve seats 3,4 in the engine of FIG. 2 is somewhat different from the position of the valve seats in the engine of FIG. 1. More particularly, the imaginary line 16 which passes through the geometric centres of the valve seats 3,4 of the engine of FIG. 2 is somewhat offset from the diameter 7 of the cylinder which is parallel to this line. Further, inlet valve seat 3 is offset towards the longitudinal axis 8 of the cylinder as compared with the position of the valve seat 3 of FIG. 1. The spacing 17 between the valve seat 3 of FIG. 2 and the nearest point of the cylinder is correspondingly increased as compared with the corresponding spacing of the engine of FIG. 1.

Most significantly, however, the side angle B of the inlet port 18 of the engine of FIG. 2 is substantially greater than the side angle A of the engine illustrated in FIG. 1. Contrary to expectations, it has been found that this large side angle does not substantially reduce the volumetric efficiency of the engine. The side angle does, however, lead to a substantial increase in efficiency of the engine in terms of high power output, low specific fuel consumption, and extremely low levels of carbon monoxide and unburnt hydrocarbons in the exhaust gases. It is believed that a wide range of inlet port side angles B will give the improved results expected, and in its broadest aspect the present invention encompasses side angles B in the range 60°–160°. It is believed, however, that the optimum side angle B is in the range of 90°–112° and preferably in the range of 95°–107°. With a particular engine tested, the optimum side angle was found to be 101°±3°.

It will be noted that the large side angle B of the engine of FIG. 2 has the effect that the inlet mixture (which is typically derived from a carburetor secured to the cylinder head) enters the combustion chamber substantially tangentially to the point of the cylinder wall which is nearest to the inlet valve seat 3. This arrangement leads to a high level of swirl within the combustion chamber. It has further been found that the best emission values of the engine are obtained when the mean air velocity in the inlet port is approximately 61 m sec$^{-1}$ (200 feet per second), assuming wide open throttle conditions. At this velocity it is believed that the degree of swirl within the combustion chamber is such that charge stratification occurs with a relatively fuel rich zone existing in the central zone of the cylinder surrounded by a relatively fuel lean zone. This type of arrangement is illustrated in FIG. 5, but it will be appreciated that FIG. 5 is purely schematic and that the actual shape and size of the fuel rich zone 20 and fuel lean zone 21 will vary with the geometry of the engine and the mean flow velocity of the inlet port. Further, within the fuel rich zone 20 and the fuel lean zone 21 there will be variations in the richness of the mixture. It will be further noted that the spark plug 5 is located adjacent one edge of the fuel rich zone. It is believed that further improvement in efficiency of the engine could be produced if the spark plug is moved closer to the centre of the fuel rich zone so as to reduce the time necessary for propagation of the fuel combustion front across the full area of the fuel rich zone 20. Positioning the sparking plug at this point will reduce the burn time for the fuel, thereby reducing the amount of ignition advance required and reducing the Nox emissions of the engine.

It should further be noted that in a typical internal combustion engine of the type in question maximum torque output tends to occur when the mean air velocity in the inlet port is approximately 91 m sec$^{-1}$ (300 feet per second). This situation appears to hold also for the engine of the present invention notwithstanding the fact that the inlet port side angle used in the present invention is substantially larger than the inlet port side angle which was conventionally considered to be acceptable.

In a typical small engine having a bore of 65.1 mm and a stroke of 44.4 mm (displacement of 148 cm$^{-3}$) working with a carburetor having a choke diameter of 14 mm optimum emission has been found to occur at about 2400 rpm and maximum torque output to occur at approximately 3600 rpm. Although there is some small reduction in emission efficiency above 2500 rpm, emissions remain low through and beyond the maximum torque speed of 3600 rpm. Maximum power of such an engine occurs at about 5700 rpm.

In the engine illustrated in FIG. 2 the side angle C of the exhaust port 19 is very substantially larger than the 0° side angle of the exhaust port 11 of the engine of FIG. 1. The side angle C of the exhaust pipe is, however, believed to be less critical to the improved characteristics of the engine according to the preferred embodiment than is the side angle B of the inlet port.

Figure 3:
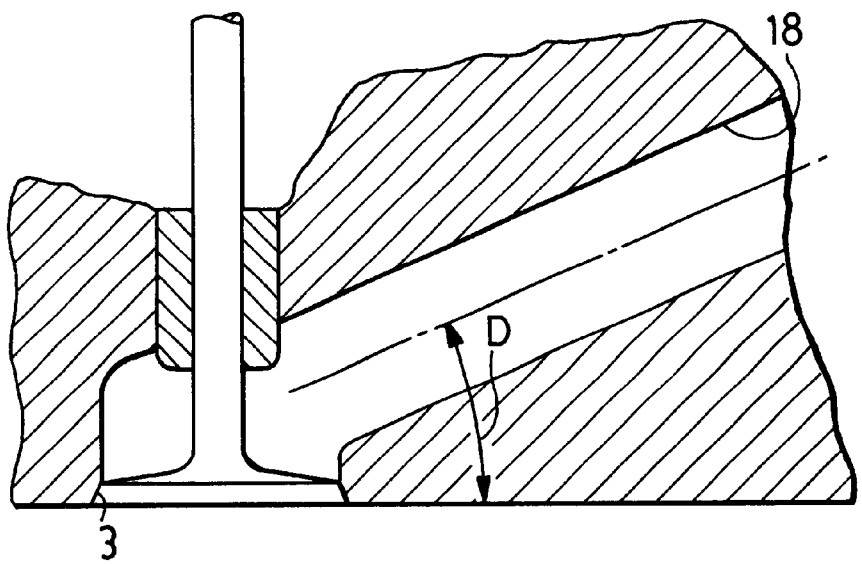
FIG. 3 is a section on the line III—III of FIG. 2.
Figure 4:
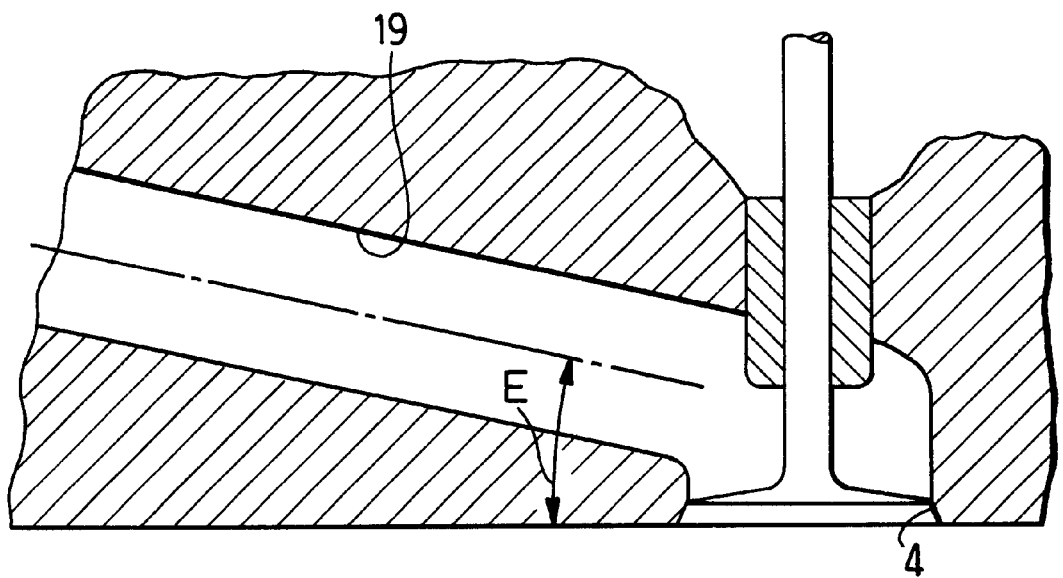
FIG. 4 is a section of the line IV—IV of FIG. 2.

The cross-sections III—III of FIG. 3 and IV—IV of FIG. 4 illustrate the vertical angles of the inlet port 18 and exhaust port 19 respectively. The inlet port vertical angle D may typically be in the range of 0°–48° but has a preferred value within the range 16°–32° with a particularly preferred angle of 24°±3°. Similarly, the exhaust valve vertical angle E can be in the range 0°–22° but is preferably in the range 5°–17° with a preferred value of 11°±3°.

It will be noted that in the above described engine both the inlet port and the exhaust port are substantially straight from the exterior surface of the cylinder head to a point immediately adjacent the valve served by the respective port. The ports are preferably of constant circular cross-section. This configuration means that the cylinder head is relatively easy to machine. With the preferred side angles and vertical angles herein described the straight ports provide the engine operating characteristics outlined above.

It will be noted that in the preferred embodiment of the engine described above the direction of the exhaust port, from the vicinity of the exhaust valve seat towards the exhaust outlet on the side of the cylinder head is generally parallel to and pointing in the same direction as the direction of the inlet port from the inlet opening towards the vicinity of the inlet valve seat. Accordingly, gases swirling in the cylinder as a result of the inlet port side angle will apparently be moving in the opposite direction to that necessary to enter the exhaust port. It would be assumed, in conventional engine design, that such positioning of the exhaust port would be highly undesirable and that the correct side angle of the exhaust port would be approximately 180° away from the actual side angle. It has been found, however, that the arrangement illustrated is perfectly satisfactory and has the advantage of relatively easy casting and machining of the cylinder head.

It will also be noted that in the illustrated embodiment the ends of the inlet and exhaust ports adjacent the inlet and exhaust valve seats respectively are substantially centred on the stems of the inlet and exhaust valves. In other words, the inlet and exhaust valve stems are located centrally of the inlet and exhaust ports respectively.

Finally, it will be noted that the improved operating characteristics of the engine in accordance with the invention result entirely from the novel configuration of the cylinder head. Accordingly, the operating characteristics of existing engines can be improved by providing such engines with a new cylinder head of the required configuration in accordance with the invention. The invention accordingly includes the method of improving the operating characteristics of an existing engine by providing it with a new cylinder head of the required design.

What is claimed is:

1. An internal combustion engine comprising: a cylinder having a longitudinal axis and being defined by a wall; a piston reciprocable within the cylinder, a cylinder head closing the top of the cylinder, an inlet valve mounted in the cylinder head, the inlet valve having a longitudinal axis; an inlet valve seat against which the inlet valve closes; means for reciprocating the inlet valve in the direction of its longitudinal axis into and out of engagement with the inlet valve seat; an exhaust valve mounted in the cylinder head, the exhaust valve having a longitudinal axis; an exhaust valve seat against which the exhaust valve closes; means for reciprocating the exhaust valve into and out of engagement with the exhaust valve seat; means secured to the cylinder head for producing a fuel/air mixture for combustion in the cylinder; and an inlet port connecting the fuel/air mixture producing means to the inlet valve seat to supply a mixture of fuel and air from the fuel/air mixture producing means to the cylinder, the inlet port being an unobstructed passage having a longitudinal axis which intersects the longitudinal axis of the inlet valve, wherein a side angle of the inlet port is greater than 60° and wherein the longitudinal axis of the inlet valve is located nearer to the longitudinal axis of the cylinder than to the wall of the cylinder.

2. An internal combustion engine according to claim 2 wherein said side angle is in the range of 90° to 112°.

3. An internal combustion engine according to claim 1 wherein said side angle is 101°±3°.

4. An internal combustion engine according to claim 1 wherein the exhaust valve side angle is in the range 83°–103°.

5. An internal combustion engine according to claim 1 wherein a vertical angle of the inlet port is in the range of 10° to 60°.

6. An internal combustion engine according to claim 5 wherein the inlet port vertical angle is 24°±3°.

7. An internal combustion engine according to claim 1 wherein an edge of the inlet valve lies substantially on the longitudinal axis of the cylinder.

8. An internal combustion engine according to claim 1 wherein an imaginary line passing through geometric centres of the inlet valve seat and the exhaust valve seat is parallel to but offset from a reference diameter of the cylinder.

9. An internal combustion engine according to claim 8 wherein the inlet port approaches the inlet valve seat from a side of the inlet valve set remote from the reference diameter.

10. An internal combustion engine according to claim 2, wherein said range is 90°–107°.

11. An internal combustion engine according to claim 4, wherein said side angle is 93°±3°.

12. An internal combustion engine according to claim 5, wherein said range is 21°–58°.

* * * * *